April 22, 1958          D. W. HODGES          2,831,253

INSTRUMENT FOR MEASURING LINEAR DIMENSIONS

Filed Nov. 12, 1953

INVENTOR.
D. W. Hodges
BY S. M. McKnight
ATTORNEY

United States Patent Office 2,831,253
Patented Apr. 22, 1958

2,831,253

INSTRUMENT FOR MEASURING LINEAR DIMENSIONS

Dewey W. Hodges, Tulsa, Okla.

Application November 12, 1953, Serial No. 391,433

5 Claims. (Cl. 33—147)

This invention relates to improvements in an instrument for accurate measurement of precision dimensions by ease of visual inspection, such as the inspection and measuring of small machine parts, screw threads, gear teeth, small pins and the like.

Ordinary precision instruments in the form of micrometers and the like make it difficult to quickly and easily obtain the measurement with the naked eye without producing somewhat of a strain on the eye, and furthermore, the measuring process is time consuming in that such instruments by the very nature of their construction will not permit expeditious measurement. The present invention is generally concerned with an instrument that will provide for measurement of variations of an object of known dimensions and project the variations of the known measurement onto a highly magnified calibrated screen in order that the measurements may be visually observed at a glance and thereby permit expeditious measurement of the object.

It is an important object of this invention to provide an instrument for fine accurate measurement through the action of a projected light beam magnified upon a calibrated screen whereby the measurement of a small degree may be seen with ease by the operator in the gauging of production work, and at great speed of operation.

And still another object of this invention is to provide an improved measuring instrument for optically projecting a magnified image of variations in dimensions of an object of known dimensions in order that the variations may be easily observed to prevent strain on the eyes, and also to effect expeditious measuring of the articles with a high degree of accuracy in measurement.

Still a further object of this invention is to provide a complete instrument for accurate measuring of very fine dimensions of objects from zero to two or more inches wherein the variations of known dimensions of the objects will be reflected by projection on a magnified screen in order to speed up the measurement of precision parts with a minimum of errors.

And still another object of this invention is to provide an instrument of precise measurement which is easy to read through a magnified projection of the dimensions and which is also simple to use, durable and inexpensive in its make-up.

Other objects and advantages of the invention will be evident from the following detailed description, read in conjunction with the accompanying drawings, which illustrate my invention.

Figure 1:
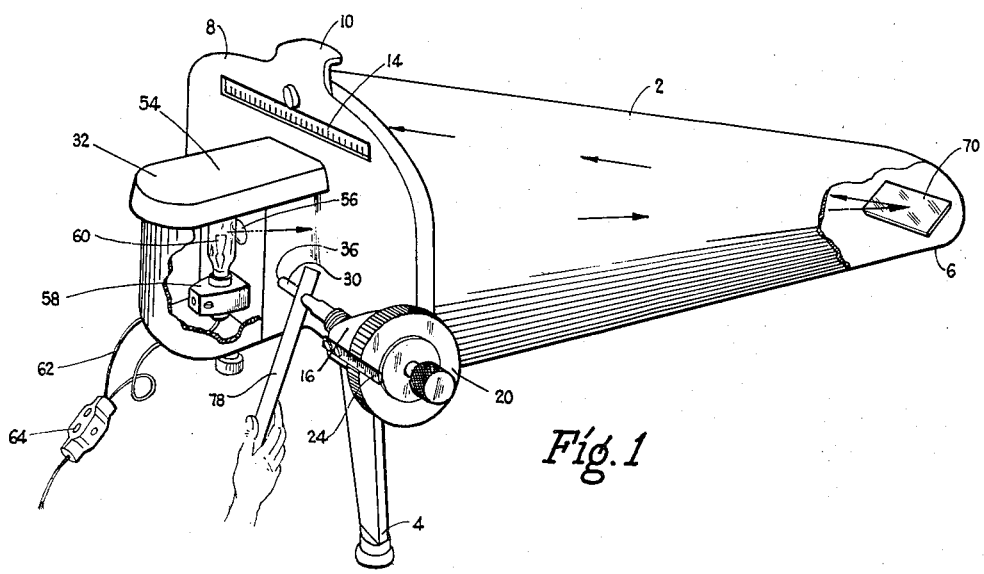
Figure 1 is a perspective view of the instrument.

Referring to the drawings in detail, reference character 2 is a housing of substantially oblong cone shape having a pair of front feet 4 (only one of which is shown) and with a rear apex portion 6 acting as a rest for that end of the housing. The housing 2 is provided with a front face portion 8 having a suitable handle 10 in order to conveniently carry the instrument. A horizontal slot 12 is provided in the front face 8 in which is disposed a transparent graduated scale 14 for purposes as will be hereinafter set forth. At one side of the front face portion 8 is provided an outwardly extending boss, or flange 16 having a threaded aperture (not shown) through which is disposed a threaded screw shaft 18 having a calibrated wheel or knob 20 fixed at one end thereof. The knob has a knurled extension 22 for convenience of operation. A calibrated scale member 24 is fixed at 26 to the boss 16 and is disposed in a horizontal plane for cooperation with the calibrated wheel or knob 20.

The screw shaft 18 is provided with an extension member 28 which in turn cooperates with an independent shaft member 30. The shaft 30 is supported through a box-like housing 32 extending outwardly from the front portion 8 of the instrument 2. The side panels 34 of the housing 32 are provided with aligned apertures 36 (Figs. 1 and 2) acting as a bearing for supporting the movable shaft 30 in a manner as will be hereinafter set forth. A strengthening boss 38 may be disposed on the inner face of the side panels 34 for supporting the shaft 30. A helical spring 40 encircles the shaft 30 and is anchored at one end by abutment against the boss 38, and at its opposite end to a shutter member 42 fixed in any suitable manner at a predetermined position on the shaft 30. The shutter or marker 42 is the upstanding type and is preferably fixed on the shaft 30 in a position to move across an aperture 44.

Figure 2:
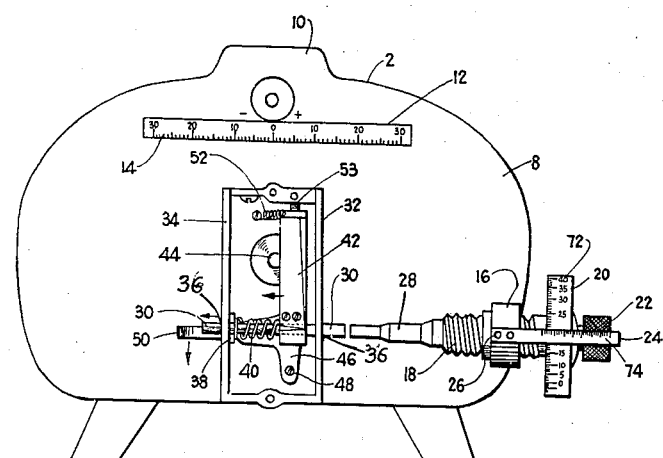
Figure 2 is a front elevational view of the instrument with certain portions thereof omitted for purposes of illustration.

A latch member 46 pivoted at 48 cooperates with the shutter 42 in any suitable manner to cause reciprocation of the shaft 30. A suitable handle 50 provided on the latch 46 extends through a slot (not shown) in the side wall 34 in order to facilitae movement of the latch member 46 and the shaft 30. It will be apparent that downward movement of the handle 50 as shown by the direction of the vertical arrow will pivot the latch 46 and move the shutter 42 in a left hand direction to cause a movement of the shaft 30 in a left hand direction as indicated by the two horizontal arrows in Fig. 2. Return movement of the shaft 30 upon release of the handle 50 is effected by the helical spring 40. The shaft 30 is normally freely rotatable in the apertures 36 and in order to prevent sideways pivoting of the shutter 42 a small helical spring 52 is connected between the back of the housing 32 and the shutter 42 to assist rigidity and maintain tension on the shutter 42. A small set screw 53 is provided in the top of the housing 32 to permit adjustment of the shutter tension. The housing 32 may be partitioned through a wall 54 having an aperture 56 (Fig. 1). An outstanding boss 58 is provided on the wall 54, and a light source 60 having suitable electrical connections 62 is supported on the boss 58. The electrical connections 62 may have an on and off switch 64 in the ordinary manner and the wires 62 connect with a source of electric supply (not shown). The position of the light source may be variable, and for convenience, the boss 58 may extend downwardly from the housing 32 with the light source attached thereto in the same manner. However, a reflecting mirror would be necessary to project the light through the aperture 44, all in a manner not shown.

Adjacent one side of the partition 54 is a lens member 66 disposed in alignment with the aperture 56 and the light source 60. Furthermore, the lens member 66 is in alignment with the aperture 44 of the magnifying lens 68 provided in the front face 8 of the instrument.

It will be apparent that the condenser lens 66 condenses the light source through the magnifying lens 68 whereby the magnified image will be projected onto a reflecting member such as a mirror 70 disposed in the rear of the housing 2 as is clearly shown in Fig. 1.

The wheel 20 is preferably calibrated at 72 in thousandths of an inch, and the increments are from zero to one hundred, thereby providing a scale from zero to one hundred/thousandths, or equal to one-tenth of an inch. The scale 24 is calibrated in tenths of an inch from zero through one inch as shown at 74, however, it may be longer if desired. It is to be understood that this invention is not limited to the particular calibration set forth, but may be varied as desired. The scale 14 in the front face 8 of the instrument 2 is calibrated in thousandths of an inch from a position in the center thereof and the increments extend in equal thousandths in each side, both left and right.

Figures 3, 4:
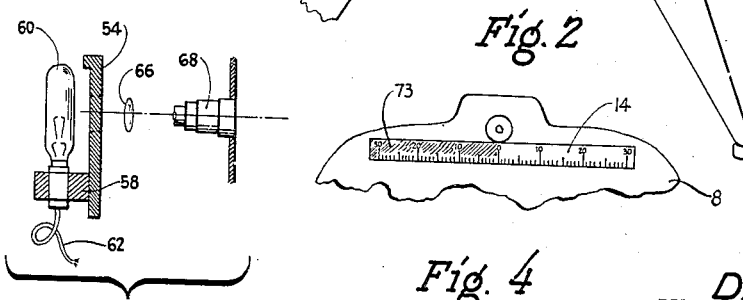
Figure 3 is a detail view partly in section of the light source and condenser lens.
Figure 4 is a detail view of scale 14 showing shadow reflections therefor.

The right hand movement of the shaft 30 is limited by a rearwardly extending flange (not shown) provided on the shutter contacting a cooperating flange (not shown) on the latch 46 thereby limiting movement of the shaft 30 and also movement of the shutter 42. These flanges coact with each other to provide movement of the shutter 42 and shaft 30. The shutter is normally disposed at the extreme right hand side of the lens opening 44 at which time the source of light passing through the aperture 44 will reflect on the scale without any shadow reflection whatsoever. In order to provide a shadow reflection on the scale 14, such as that shown in the shadowed portion 73 of Fig. 4, the shaft 30 is moved by left hand movement of the threaded shaft 28 abutting thereagainst to move the shutter 42 until it is disposed in a position to cover substantially one half of the aperture 44 so that the edge of the shadow 73 from the reflection of the light in normal position stops at the zero mark on the scale 14. Any slight movement of the shutter 42 from a center position respecting the aperture 44 will provide a reflection of the light in the mirror 70 which in turn is reflected onto the scale 14 and magnified a hundred times. This magnification is not constant and any variation thereof may be utilized as desired. It will thus be seen that if an object to be measured is only ten thousandths of an inch thick, an insertion of the object between the ends of the shafts 28 and 30 will show the correct measurement of the object upon the scale 14 on the right hand, or plus side of the scale in the amount of ten thousandths. Of course the latch handle 50 permits movement of the shaft 30 to the left against the action of the spring 40 for insertion of an object such as 78 (Fig. 1) between the shafts. In this manner, the exact dimension of an object may be determined within limits of the particular calibration set up on the respective scales.

The magnification of the thousandths of an inch measurement of the object 78 (Fig. 1) as above mentioned as shown on the scale 14 is preferably one hundred times as previously mentioned. However, it will be apparent that the amount of magnification is relative to the position of the shutter 42, and is also dependent upon the size of the magnifying lens 68 and the distance from the reflecting mirror 70.

When it is desired to measure small parts for inspection on a production basis, such as utilized in aircraft and other machine tool manufacturing, the speed of inspection of thousands of small parts, as well as larger ones, is important. A particular part and particularly any variations in size, both under and over size, may be easily and expeditiously determined by merely setting the zero mark on the calibrated wheel 20 adjacent the zero position on the scale 24 in order to bring the ends of the shafts 28 and 30 in abutting relation, and the shadow reflection 73 is at the zero position on the scale 14. The calibrated wheel 20 is then rotated to the known or predetermined dimension of the part 78 to be measured, for example, if the part has a dimension of .185 of an inch, it is only necessary to rotate the knob 20 through the one hundred increments thereon to a position past the one mark on the scale 24 and continued rotation of the wheel 20 brings the increment 85 of the wheel 20 adjacent or flush with the scale 24, thereby providing a gap or distance between the ends of the shafts 28 and 30 amounting to .185. Consequently, the handle 50 can be actuated to permit movement of the shaft 30 and insertion of the part 78 between the ends of the shafts 28 and 30. With such a gap provided between the ends of the shafts 28 and 30 the shadow reflection 73 is not shown on the scale 14 because the shutter is positioned at right of the aperture 44. However, insertion of the part 78 into the gap will move the shaft 30, and the shutter 42 to move the shutter over the aperture 44 so that the shadow 73 will be reflected on the scale 14, either in an over or under sized measurement respecting the calibrations on the scale 14. Of course, if the part being measured is exactly .185, the shadow will reflect at the zero mark showing that the part measures out correctly. Once a setting of the shaft 28 relative to a size of the part to be measured has been made, no further adjustment is necessary for measurement of the part, and an indefinite number of parts of similar size can be measured. If the shadow reflection on the scale 14 moves from the zero mark on the scale 14 to the left any number of calibrations, it instantly tells the operator that the object being measured is that many thousandths undersized. On the other hand, if the shadow reflection moves to the right of the zero mark on the scale 14, the part is oversized in thousandths of an inch the amount the shadow has moved to the right. The scale 14 has been calibrated so that the digits or increments have been magnified so that the one thousandth variation in the accurate dimension of the object being measured reflects on the scale one hundred times larger in order to facilitate ease of reading the variations and dimensions.

Space limits of the scale 14 may not permit an unusaul extension of the scale in the recess slot 12. With any predetermined setting of the knob, such as .185 for a piece 78, the shadow 73 normally at the zero position of the scale 14 may disappear. However, with placement of the object to be inserted in the gap between the shafts 28 and 30, the movement of the shutter 42 and the shadow reflection 73 on the scale 14 will be present to show the variation in the size of the piece, whether it be oversized or undersized, in one thousandths of an inch magnified one hundred times for easy visual reading.

It will be apparent that in order to measure a larger size than one inch, for example, the threaded rod element 28 may be replaced with a similar rod one inch shorter thereby permitting variations in measurements of objects more than one inch in increments of one thousandths of an inch. Furthermore, it will be apparent that the instrument is not limited to any particular size of object to be measured, but as a practical matter, precise measurement of small objects in an easy visual manner and expeditiously limits the dimensions of the object to be measured to smaller sized objects.

From the foregoing, it will be apparent that the present invention contemplates an instrument for fine accurate measurement through the action of a projected light beam magnified on a calibrated screen so that over and under size of a pre-determined object being measured can be easily observed by the operator. Furthermore, it will be apparent that the magnifications on the calibrated screen are easy to read and facilitate expeditious gauging of precision parts, particularly on a production basis.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. An instrument for measurement of dimensions by the projection of light rays comprising a light source, light projecting means, a magnifying means cooperating therewith, a transparent scale for receiving reflections of magnified images from the magnifying means, a threaded shaft having a scaled wheel rotatable therewith, a scale member disposed in fixed relation to the scaled wheel and cooperating therewith to provide a pre-determined adjustment of the threaded shaft, a movable shaft in alignment with the threaded shaft and cooperating therewith for holding a part to be measured, a shutter movable relative to the light projecting means to provide a shadow reflection on the transparent scale, said shutter fixed to the movable shaft and responsive to a normal position of the movable shaft to bisect the light ray from the projecting means and disclose a shadow reflection at a zero position on the transparent scale, said movable shaft responsive to variations in dimensions of a part held between the shafts to provide simultaneous movement of the shutter relative to the light projecting means to provide simultaneous variations from the zero mark on the transparent scale.

2. An instrument for measurement of dimensions by the projection of light rays comprising a light source, light projecting means, a transparent scale for receiving reflections of magnified images from the light projecting means, a threaded shaft having a scaled wheel rotatable therewith, a scale member disposed in fixed relation to the scaled wheel and cooperating therewith to provide a pre-determined adjustment of the threaded shaft, a movable shaft in alignment with the threaded shaft for receiving a part to be measured therebetween, a shutter fixed to the movable shaft for bisecting the ray of light from the light projecting means in response to movement of the movable shaft to indicate variations in dimensions by shadow reflection on the transparent scale.

3. An instrument for measurement of dimensions by the projection of light rays comprising a light source, light projecting means, a transparent scale for receiving reflections of magnified images from the light projecting means, a threaded shaft having a scaled wheel rotatable therewith, a scale member disposed in fixed relation to the scaled wheel and cooperating therewith to provide a pre-determined adjustment of the threaded shaft, a movable shaft in alignment with the threaded shaft for receiving a part to be measured therebetween, means cooperating with the movable shaft to provide a shadow reflection on the transparent scale to indicate measurement of a part held by the shafts.

4. An instrument for measurement of dimensions by the projection of light rays comprising a light source, light projecting means, a transparent scale for receiving reflections of magnified images from the light projecting means, a threaded shaft having a scaled wheel rotatable therewith, a scale member disposed in fixed relation to the scaled wheel and cooperating therewith to provide a pre-determined adjustment of the threaded shaft, a movable shaft in alignment with the threaded shaft for receiving a part to be measured therebetween, means fixed on the movable shaft and responsive to a normal position of the movable shaft to bisect the light ray emitted by light projecting means to provide a shadow reflection at the zero position on the transparent scale, said means responsive to variable movements of the movable shaft to provide simultaneous variations on the shadow reflections from the zero mark on the transparent scale.

5. An instrument for measurement of dimensions by the projection of light rays comprising a light source, light projecting means, a transparent scale for receiving reflections of magnified images from the light projecting means, a pair of movable shafts for receiving an object to be measured therebetween, one of said shafts cooperating with a scale to provide a pre-determined adjustment with respect to the other of said shafts, means fixed on the shaft other than the shaft cooperating with the scale for bisecting the light ray from the projecting means in response to a movement of said shaft in order to indicate variations in over and under sized dimensions by a shadow reflection on the transparent scale.

References Cited in the file of this patent
UNITED STATES PATENTS

| | | |
|---|---|---|
| 2,016,014 | Mackenzie | Oct. 1, 1935 |
| 2,307,950 | Plant et al. | Jan. 12, 1943 |
| 2,338,190 | Loxham | Jan. 4, 1944 |
| 2,355,910 | Gallasch | Aug. 15, 1944 |
| 2,412,665 | Young | Dec. 17, 1946 |
| 2,773,311 | Kettler | Dec. 11, 1956 |

FOREIGN PATENTS

| | | |
|---|---|---|
| 237,422 | Switzerland | Aug. 1, 1945 |